US005879186A

United States Patent [19]

Harada

[11] Patent Number: 5,879,186

[45] Date of Patent: Mar. 9, 1999

[54] BULB SOCKET

[75] Inventor: Tadashi Harada, Shizuoka, Japan

[73] Assignee: Koito Manufacturing Co., Ltd., Tokyo, Japan

[21] Appl. No.: 878,603

[22] Filed: Jun. 19, 1997

[51] Int. Cl.$^{6}$ .............................. H01R 13/73; H02B 1/01

[52] U.S. Cl. .............................................................. 439/549

[58] Field of Search ................................ 439/546, 699.2, 439/547, 548, 549

[56] References Cited

U.S. PATENT DOCUMENTS

| | | | |
|---|---|---|---|
| 3,559,152 | 2/1971 | Pearce, Jr. | 439/548 |
| 4,373,771 | 2/1983 | Cross et al. | 439/549 |
| 4,752,241 | 6/1988 | Matsuoka et al. | 439/619 |
| 4,871,331 | 10/1989 | Kondo et al. | 439/736 |
| 4,957,455 | 9/1990 | Horiuchi et al. | 439/548 |

*Primary Examiner*—Gary Paumen
*Assistant Examiner*—Briggitte R. Hammond
*Attorney, Agent, or Firm*—Sughrue, Mion, Zinn, Macpeak & Seas, PLLC

[57] ABSTRACT

A bulb socket engageable in a socket mounting hole of a bulb mounting member. The bulb socket includes a socket main body (10) which is formed of resin and includes a bulb insertion opening (12), a plurality of securing projections (20) extending from the socket main body, which are engageable with a socket mounting hole (62), and a plurality of elastic hold portions which cooperate with the securing projections (20) to hold the peripheral edge portion of the socket mounting hole (60). The elastic hold portions are disposed, respectively, at the substantially quadrisected positions of a horizontal flange portion (30) spaced a given distance from the securing projections (20) in such a manner that they are separated apart from the horizontal flange portion (30) through right and left slits (32) and extend outwardly in the radial direction of the horizontal flange portion (30). The leading end portions of the extending portions of the elastic hold portions have belt-shaped elastic hold pieces (34) which project forwardly of the horizontal flange portion (30). Due to this structure, the flexibility of the belt-shaped elastic hold pieces (34) can be enhanced, and the mounting and removal of the socket main body (10) can be facilitated. At the same time, a force to push the socket main body (10) into the socket mounting hole (62) can be received by the horizontal flange portion (30) having excellent rigidity, thereby being able to prevent the belt-shaped elastic hold pieces (34) from breaking.

16 Claims, 14 Drawing Sheets

BULB SOCKET

BACKGROUND OF THE INVENTION

1. Field of the Invention

The present invention relates to a bulb socket and, in particular, to a socket for a wedge base bulb (no-cap bulb) or the like for use in an automobile lighting device and the like.

2. Related Art

With reference to FIGS. 14 to 16, there is shown a conventional bulb socket for a wedge base bulb. FIG. 14 is a perspective view of a bulb socket and a socket mounting hole, FIG. 15 is a section view of the periphery of the socket mounting hole into which a bulb socket with an integrally inserted bulb is mounted, and FIG. 16 is a section view to show how to mount the bulb socket into the socket mounting hole.

As shown in these figures, the conventional bulb socket includes a socket main body 2 which is formed of synthetic resin. The socket main body 2 includes a bulb insertion opening 3 which is opened forwardly and into which a wedge base bulb 5 can be inserted. Within the bulb insertion opening 3 there are stored a plurality of terminals 4 which respectively include mutually opposing contact hold pieces 4*a*. When the wedge base bulb 5 is inserted into the bulb insertion opening 3, the base portion 5*a* of the bulb 5 is clamped by these mutually opposing contact hold pieces 4*a*, thereby achieving electrical contact between lead wires exposed on the surface of the base portion 5*a* and the terminals 4.

Provided on the outer periphery of the socket main body 2 are a plurality of securing projections 7 which can be engaged in a bayonet-like manner with a socket mounting hole 9*a* formed in a lamp body 9, and a plurality of elastic flange portions 8 which extend obliquely toward the securing projection 7 side. The securing projections 7 and the flange portions 8 are respectively spaced a given distance from each other in the axial direction of the socket main body 2. As shown by the arrow line in FIG. 16, if the socket main body 2 is pushed into the socket mounting hole 9*a* with the securing projections 7 matched thereto and also the thus pushed-in socket main body 2 is rotated a given amount along the peripheral edge portion of the mounting hole 9*a*, then the peripheral edge portion of the mounting hole 9*a* can be held by and between the securing projections 7 and elastic flange portions 8. That is, the socket main body 2 with the integrally inserted bulb 5 can be fixed and held in the socket mounting hole 9*a* due to the elasticity of the elastic flange portions 8. Here, reference character 9*b* designates notches which are formed in the socket mounting hole 9*a* in such a manner that they can be matched to the securing projections 7*a* provided on the socket main body 2 side.

In the above-mentioned conventional socket hold structure using the elasticity of the elastic flange portions 8, the retaining capability of the socket main body 2 within the socket mounting hole 9*a* is not sufficient and the bulb socket cannot be mounted in or removed from the socket mounting hole 9*a* smoothly.

That is, the elastic flange portions 8 extend obliquely forwardly from the socket main body 2 so that they can cooperate together with the securing projections 7 to hold the peripheral edge portion of the socket mounting hole 9*a*. Additionally, the elastic flange portions have sufficient flexibility to allow for easy mounting and removal of the bulb socket. Due to this, however, clearances caused between the securing projections 7 and the associated root portions of the elastic flange portions 8 are far greater than the plate thickness of the peripheral edge portion of the socket mounting hole 9*a*, which results in the engagement between the socket main body 2 and socket mounting hole 9*a* being loosened.

If the plate thickness of the elastic flange portion 8 is increased to thereby enhance the rigidity (that is, reduce the flexibility) of the elastic flange portion 8 as well as to thereby apply a greater holding force between the securing projection 7 and the elastic flange portion 8, then it is possible to prevent the disengagement between the socket main body 2 and socket mounting hole 9*a*. However, the increased thickness of the elastic flange portion 8 also increases a frictional resistance when the socket main body 2 is rotated along the socket mounting hole 9*a*, which makes it difficult to mount and remove the socket main body 2. Especially, when mounting the socket main body 2 into the socket mounting hole 9*a*, as shown in FIG. 16, it is generally necessary to push in the socket main body 2 up to a front position where the securing projections 7 are moved beyond the peripheral edge portion of the socket mounting hole 9*a*, which requires a great force when mounting the socket main body 2 in the socket mounting hole 9*a*. Also, in the winter season or in cold districts, since the elasticity of resin (that is, the flexibility of the elastic flange portion 8) is lowered, it is even more difficult to mount and remove the socket main body 2.

On the other hand, if the thickness of the elastic flange portion 8 is decreased to thereby enhance the flexibility thereof, then the socket main body 2 can be mounted and removed smoothly with a slight force. However, since the holding force of the peripheral edge portion of the socket mounting hole 9*a* by the elastic flange portions 8 is correspondingly reduced, the engagement between the socket main body 2 and socket mounting hole 9*a* can be loosened easily. Also, as the thickness of the elastic flange portion 8 is reduced, there is a greater likelihood that the elastic flange portion 8 will experience fatigue and break. This is particularly true in the winter season or in cold districts. Specifically, when pushing the socket main body 2 into the socket mounting hole 9*a*, there is a possibility that a bending stress equal to an allowable stress or greater will be applied to the elastic flange portion 8 by mistake and thus the elastic flange portion 8 can be broken. In short, if the thickness of the elastic flange portion 8 is reduced, then the elastic flange portion 8 is poor in durability.

SUMMARY OF THE INVENTION

The present invention aims at eliminating the drawbacks found in the above-mentioned conventional bulb socket. Accordingly, it is an object of the invention to provide a bulb socket which can be positively fixed to and held by a socket mounting hole and also includes a socket mounting hole hold portion which is excellent in durability.

In attaining the above object, according to the invention, there is provided a bulb socket comprising, on the outside surface of a socket main body formed of resin and including a bulb insertion opening, a plurality of securing projections bayonet engageable with a socket mounting hole formed in a bulb mounting member to thereby prevent the socket main body against removal, and a plurality of elastic hold portions cooperarable with the securing projections to hold the peripheral edge portion of the socket mounting hole, wherein, while a horizontal flange portion is disposed on the peripheral portion of the socket main body outside surface that is spaced apart from the securing projections by an amount slightly greater than the plate thickness of the socket mounting hole peripheral edge portion, the elastic hold portions are respectively disposed at a plurality of substantially equally divided positions of the horizontal flange portion in the peripheral direction thereof, the elastic hold portions are respectively separated apart from the horizontal flange portion through slits formed on the right and left sides thereof and extend outwardly in the radial direction of the horizontal flange portion, and the leading end portions of the outwardly extending portions of the elastic hold portions are composed of belt-shaped elastic hold pieces respectively projecting forwardly of the horizontal flange portion.

As the structure of the above-mentioned belt-shaped elastic hold piece, for example, there are available a belt-shaped elastic hold piece structured such that it extends out substantially in parallel to the horizontal flange portion and includes a forwardly projecting projection in the leading end portion of the extension portion thereof, and a belt-shaped elastic hold piece structured so that it extends out in an inclined manner so that it can extend forwardly as it approaches the leading end portion of the extension portion thereof.

In a state that the socket main body is in engagement with the socket mounting hole, the peripheral edge portion of the socket mounting hole is held by the securing projections and belt-shaped elastic hold pieces, and the horizontal flange portion extends adjacent to the peripheral edge portion of the socket mounting hole to produce only a slight clearance between the peripheral edge portion of the socket mounting hole and the horizontal flange portion, so that the socket main body can be positively fixed to and held by the socket mounting hole while the engagement between them is prevented from being loosened. Especially, a plurality of belt-shaped elastic hold pieces are disposed at the substantially equally divided positions of the socket main body in the peripheral direction thereof, so that the forces of the belt-shaped elastic hold pieces for fixing and holding the socket main body can be made uniform in the peripheral direction of the socket mounting hole.

Also, the belt-shaped elastic hold pieces pressed against the peripheral edge portion of the socket mounting hole operate in such a manner that they can reduce a load such as vibrations to be transmitted from the bulb mounting member to the socket main body. A plurality of belt-shaped elastic hold pieces are disposed at the substantially equally divided positions of the socket main body in the peripheral direction thereof, so that they can reduce effectively a load transmitted from any directions in the peripheral direction of the socket main body.

Further, the present belt-shaped elastic hold piece is higher in flexibility than a conventional wide elastic flange portion, and an elastic force acting on the present belt-shaped elastic hold piece when the socket main body is engaged with the socket mounting hole is smaller than an elastic force acting on the conventional elastic flange portion, so that a frictional resistance produced when the socket main body is rotated with respect to the socket mounting hole is small. Specifically, a plurality of belt-shaped elastic hold pieces are disposed at the substantially equally divided positions of the socket main body in the peripheral direction thereof, so that frictional resistances produced when the socket main body is rotated with respect to the socket mounting hole can be made uniform in the peripheral direction of the socket mounting hole.

Although the excellent flexibility of the present belt-shaped elastic hold piece raises a fear that, when the socket main body is pushed into the socket mounting hole, an excessive load (a stress equal to an allowable stress or greater) can be applied to the belt-shaped elastic hold piece, if the socket main body is pushed into the socket mounting hole a given amount or more and thus the securing projections are situated on the front side of the socket mounting hole (that is, the belt-shaped elastic hold piece is oscillated and sunk into the slit of the horizontal flange portion), then the highly rigid horizontal flange portion is butted against the peripheral edge portion of the socket mounting hole to thereby prevent a load of a given intensity or more (that is, a stress equal to an allowable stress or more) from being applied to the belt-shaped elastic hold piece. specifically, since a plurality of belt-shaped elastic hold pieces are disposed at the substantially equally divided positions of the socket main body in the peripheral direction thereof, a load or a reaction to a force to push the socket main body into the socket mounting hole can be dispersed to a plurality of belt-shaped elastic hold pieces, thereby eliminating the possibility that the load can be applied to only part of the belt-shaped elastic hold pieces.

Also, when the belt-shaped elastic hold pieces are composed of a plurality of belt-shaped elastic hold pieces which differ in length from each other, the belt-shaped hold pieces are formed in such a manner that (1) the longer length they have, the more forwardly the extension leading end portions thereof exist, (2) the shorter length they have, the thinner the plate thicknesses thereof are, or (3) the shorter length they have, the narrower the widths thereof are. Due to this, the elastic forces of the respective belt-shaped elastic hold pieces acting on between the socket main body and the peripheral edge portion of the socket mounting hole (that is, the forces of the respective belt-shaped elastic hold pieces to press themselves against the peripheral edge portion of the socket mounting hole) can be made uniform.

Further, when the socket main body is engaged with the socket mounting hole, there is generated a bending stress in the belt-shaped elastic hold pieces. However, if the belt-shaped elastic hold pieces having a long length are formed in such a manner that the plate thickness of the leading end side thereof is smaller than the plate thickness of the root side thereof, then a sufficient flexibility can be achieved on the leading end side of the belt-shaped elastic hold piece on which a small bending stress acts, and a sufficient bending strength can be achieved on the root side of the belt-shaped elastic hold piece on which a large bending stress acts.

DESCRIPTION OF THE PREFERRED EMBODIMENTS

Figure 1:
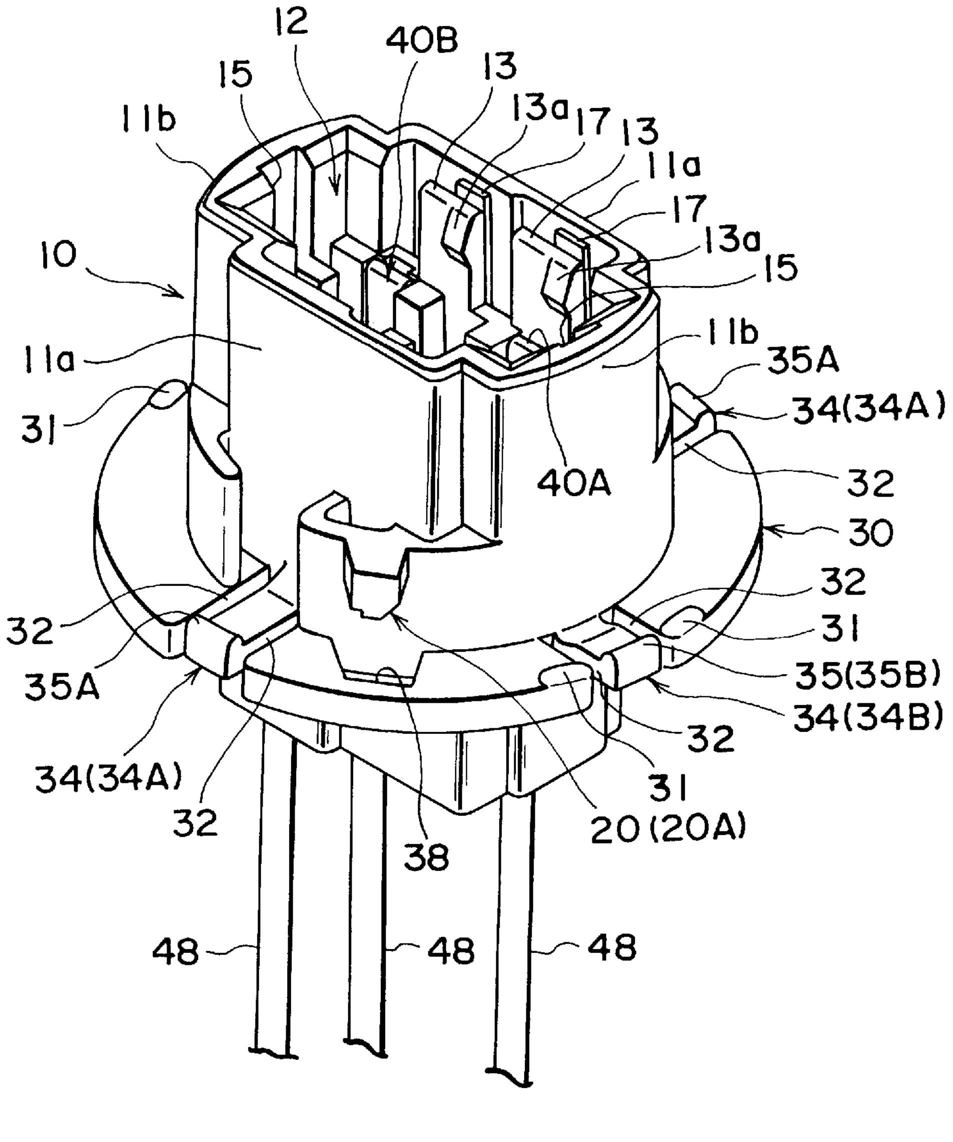
FIG. 1 is a perspective view of a first embodiment of a socket for a wedge base bulb according to the invention.
Figure 2:
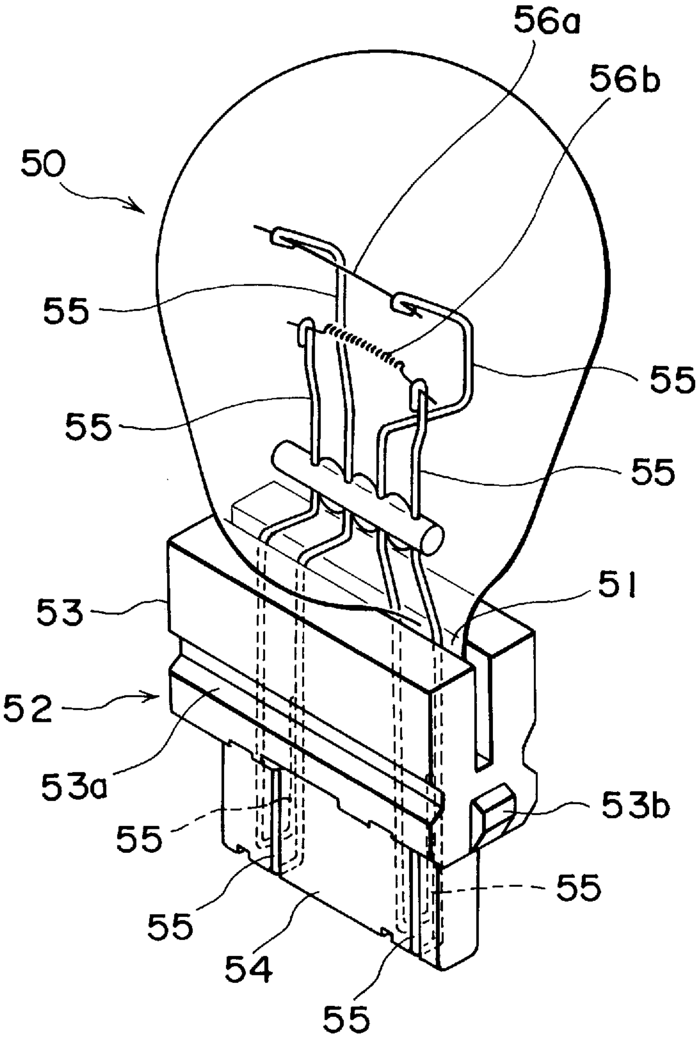
FIG. 2 is a perspective view of a wedge base bulb to be inserted into the above socket.
Figure 3:
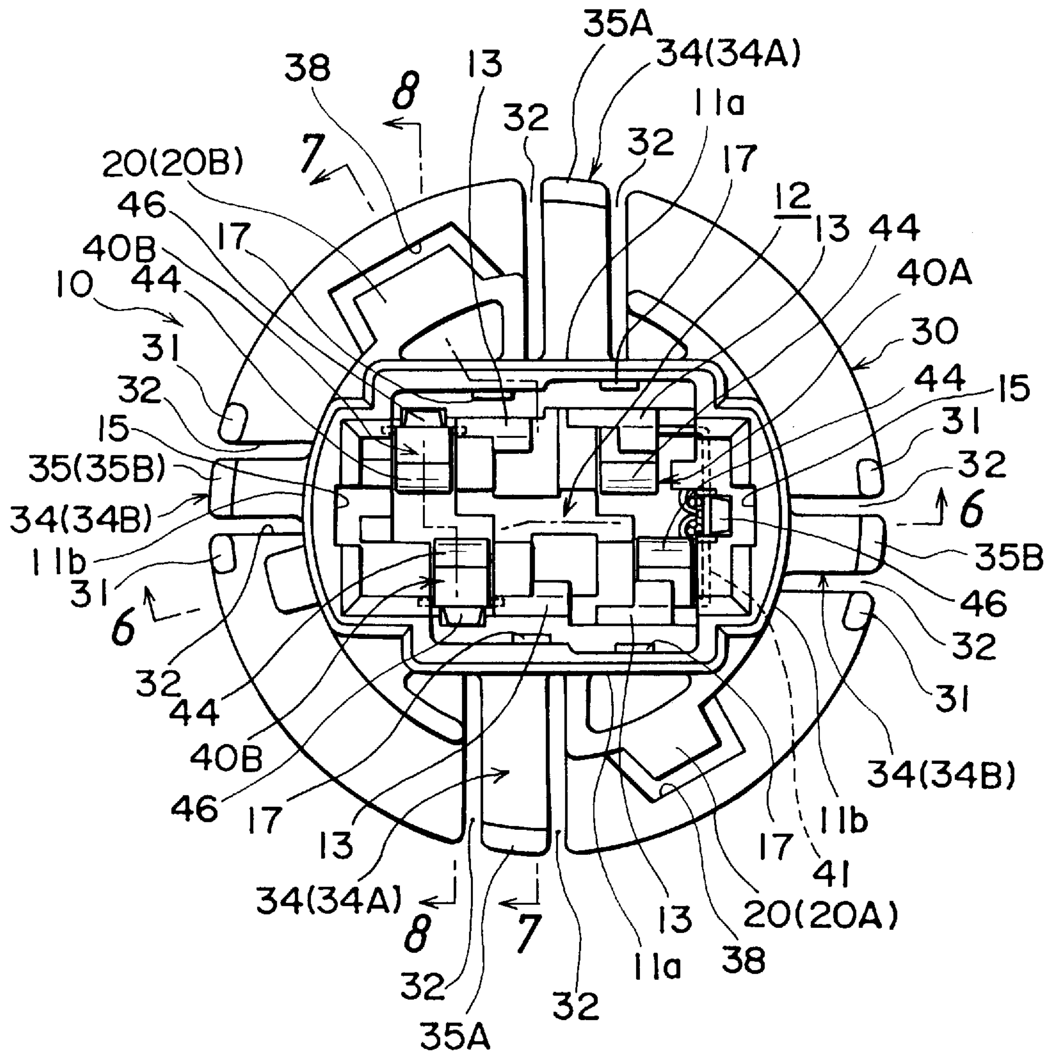
FIG. 3 is a plan view of the above socket.
Figure 4:
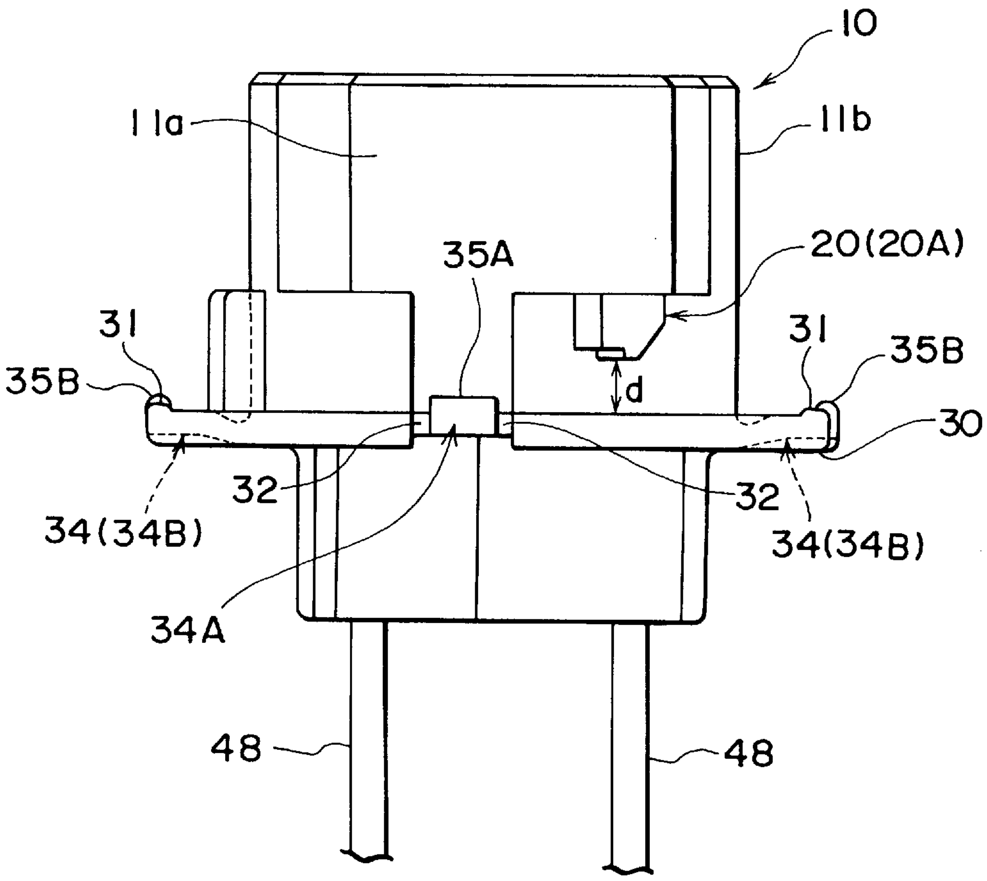
FIG. 4 is a front view of the above socket.
Figure 5:
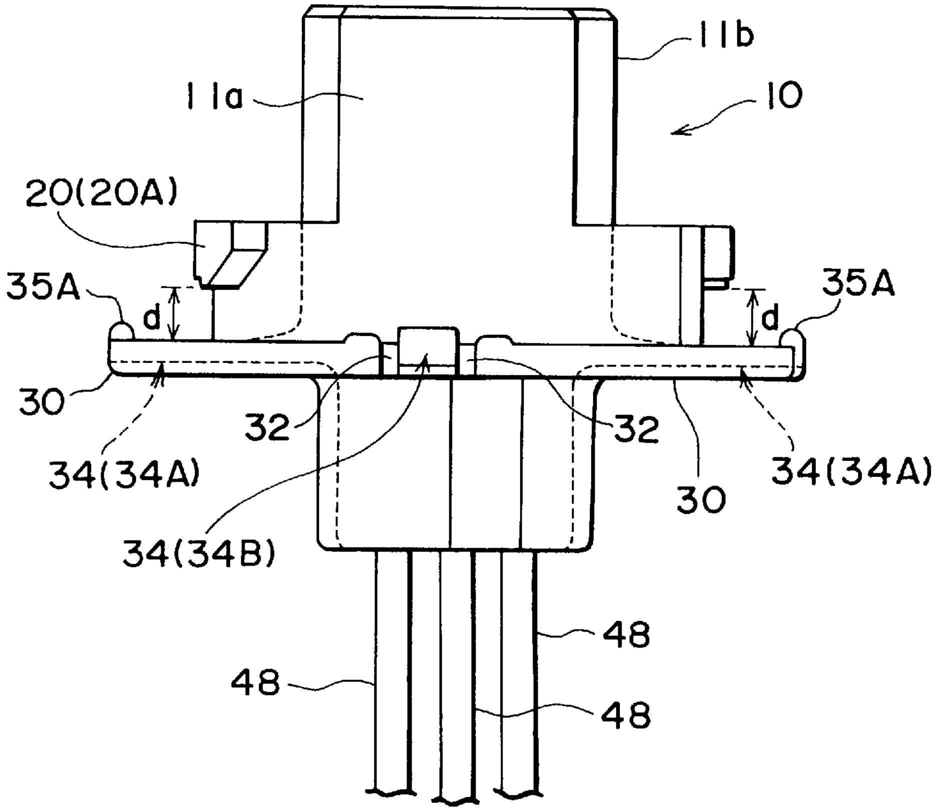
FIG. 5 is a right side view of the above socket.
Figure 6:
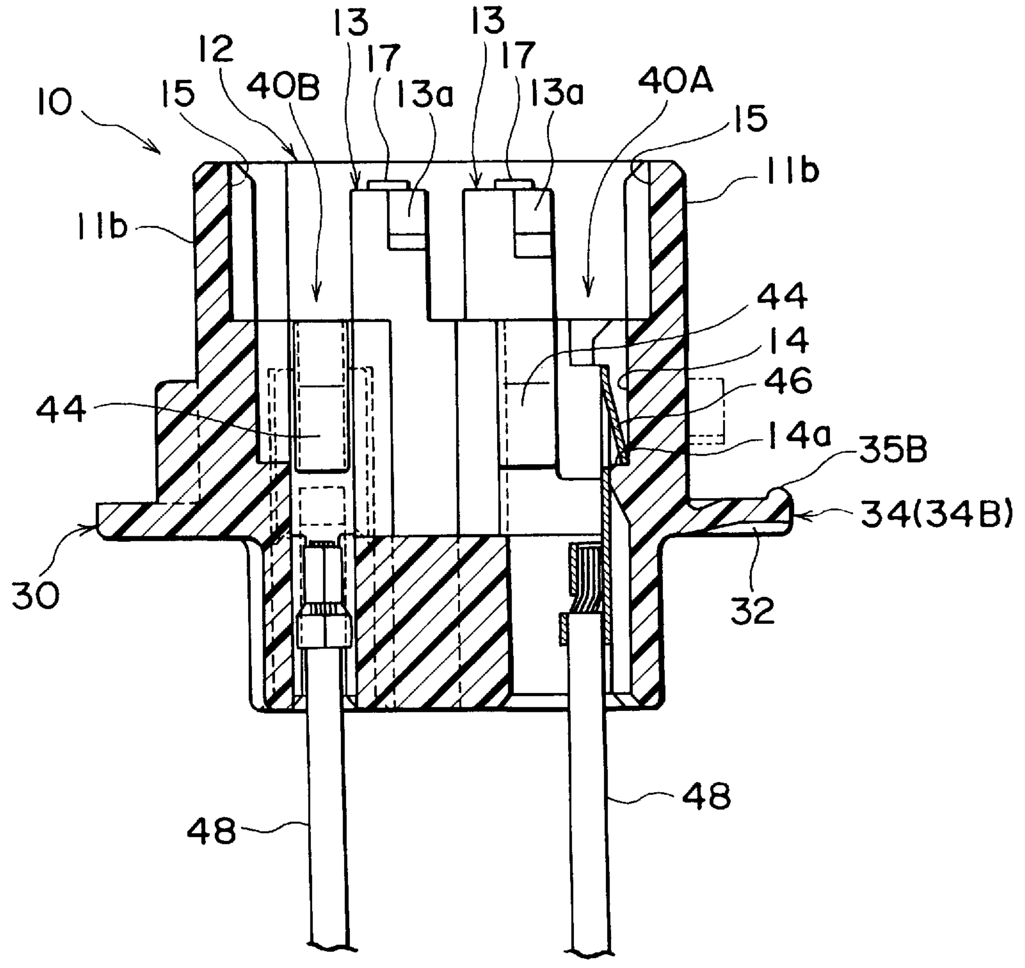
FIG. 6 is a longitudinal sectional view of the above socket taken along the line 6—6 in FIG. 3.

Now, description will be given below of an embodiment of a bulb socket according to the invention with reference to the accompanying drawings.

In FIGS. 1 to 12, there is shown a first embodiment of a bulb socket according to the invention.

In these figures, reference character 50 designates a wedge base bulb (which is hereinafter referred to as a bulb) in which two filaments 56*a* and 56*b* are disposed in parallel within a glass spherical body in such a manner that the two end portions thereof are supported by their respective lead supports 55. Also, the bulb 50 further includes a pinch-sealed flat bulb base end portion 51 which is formed integral with a base 52 formed of synthetic resin in a rectangular block shape.

The base 52 of the bulb 50 comprises a bulb hold portion 53 which is formed in a rectangular block and is used to hold in an enveloping manner the bulb base end portion 51, and a flat lead wire hold portion 54 for holding lead wires (that is, lead supports) 55 which are respectively guided from the bulb base end portion 51. Also, on the outside surface of the bulb hold portion 53, there are formed recessed grooves 53*a* which are engageable by pawls 13*a* formed in elastic hooks 13 (to be described later) to thereby prevent the base 52 from being removed. Further, on the outside surface of the lead wire hold portion 54, there are exposed the lead wires (lead supports) 55 which are electrically connected with the filaments 56*a* and 56*b* provided within the bulb 50.

Reference character 10 identifies a bulb socket main body (which is hereinafter referred to as a socket main body) which is formed of synthetic resin and has a cylindrical shape. The socket main body 10 includes on the front end side thereof a bulb insertion opening 12 into which the wedge base bulb 50 can be inserted. The bulb insertion opening 12 is formed in a rectangular shape which corresponds to the base 52 of the bulb 50. Four elastic hooks 13, for holding the base 52 of the bulb 50 inserted into the bulb insertion opening 12, are erected in pairs along the two long side surface walls 11*a* forming the bulb insertion opening 12 in such a manner that they are opposed to each other.

Vertical grooves 15 are formed in the insides of the short side surface walls 11*b* forming the bulb insertion opening 12. The vertical grooves 15 slidably receive rectangular projections 53*b* provided on the base 52 of the bulb 50 so that the bulb 50 can be positioned in the vertical and horizontal direction of the bulb insertion opening 12.

Therefore, by pushing the base 52 of the bulb 50 into the bulb insertion opening 12 against the elasticity of the is elastic hooks 13, or by removing it from the bulb insertion opening 12 against the elasticity of the elastic hooks 13, the bulb 50 can be inserted into or removed from the bulb insertion opening 12.

Also, at positions that are situated inside the long side surface walls 11*a* and in correspondence with the elastic hooks 13, there are provided projecting portions 17. The projecting portions 17 reduces the clearances between the elastic hooks 13 and the side surface walls 11*a*. The projection portions thus eliminates the possibility of the base 52 of the bulb 50 being inadvertently inserted in the clearance between the hooks 13 and side surface walls 11*a* so that the elastic hooks 13 will not be broken.

Figure 7:
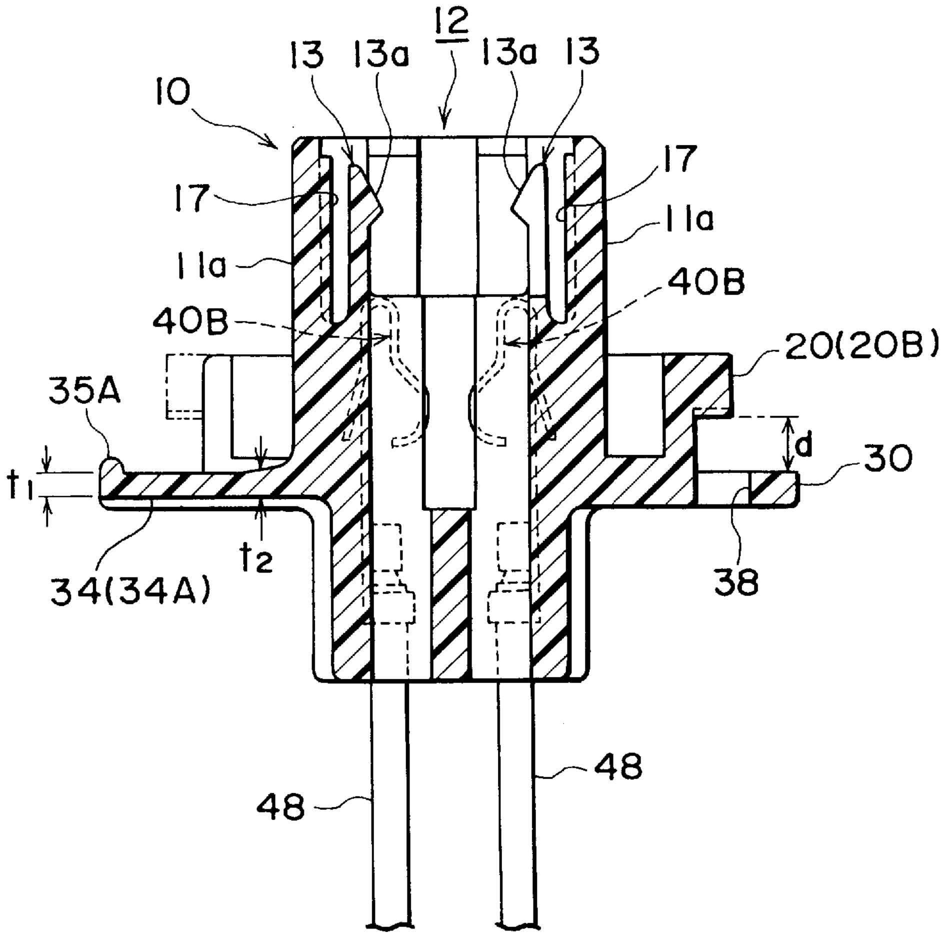
FIG. 7 is a longitudinal sectional view of the above socket taken along the line 7—7 in FIG. 3.
Figure 8:
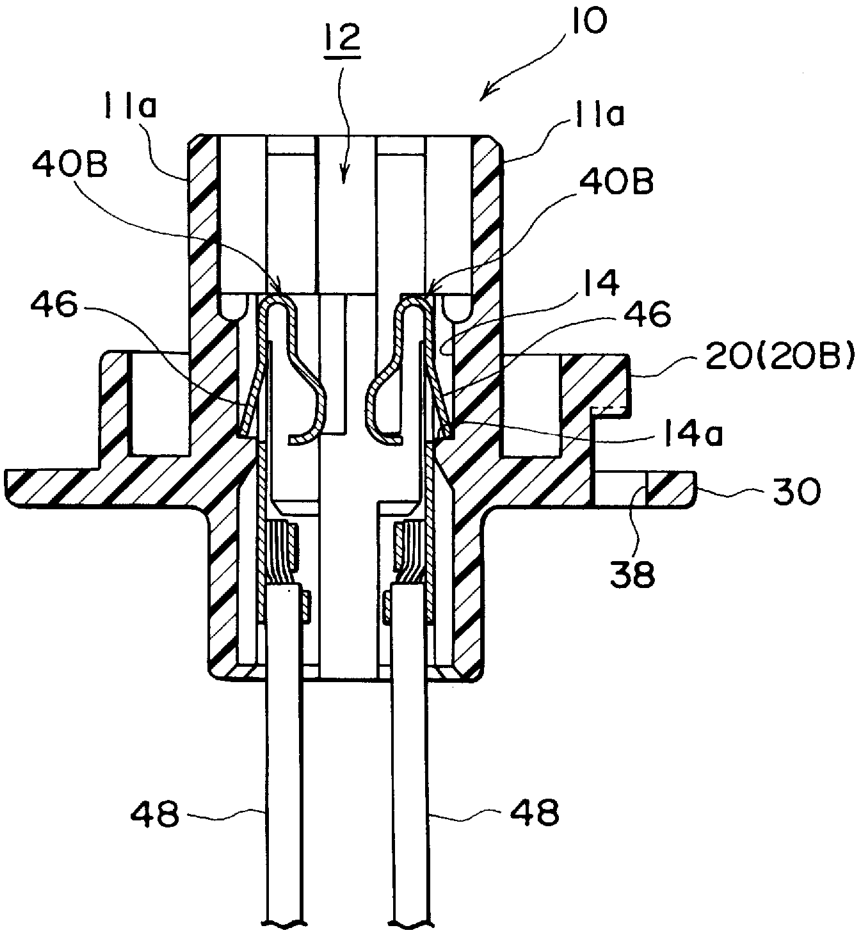
FIG. 8 is a longitudinal sectional view of the above socket taken along the line 8—8 in FIG. 3.

The upper ends of the projecting portions 17, as shown in FIG. 7, extend to a height position corresponding to the upper end portions of the hooks 13 and side surface walls 11*a* and serve also as a guide for guiding the base 52 of the bulb 50 into the bulb insertion opening 12.

Figure 9:
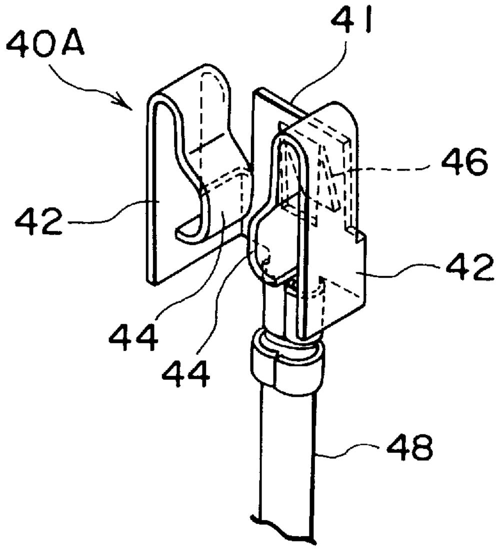
FIG. 9 is a perspective view of a terminal to be stored within the above socket.
Figure 10:
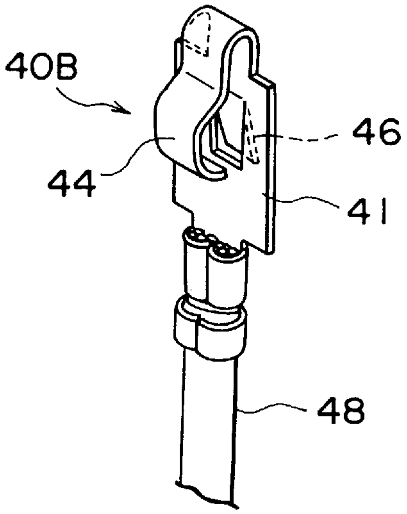
FIG. 10 is a perspective view of a terminal to be stored within the above socket.
Figure 11:
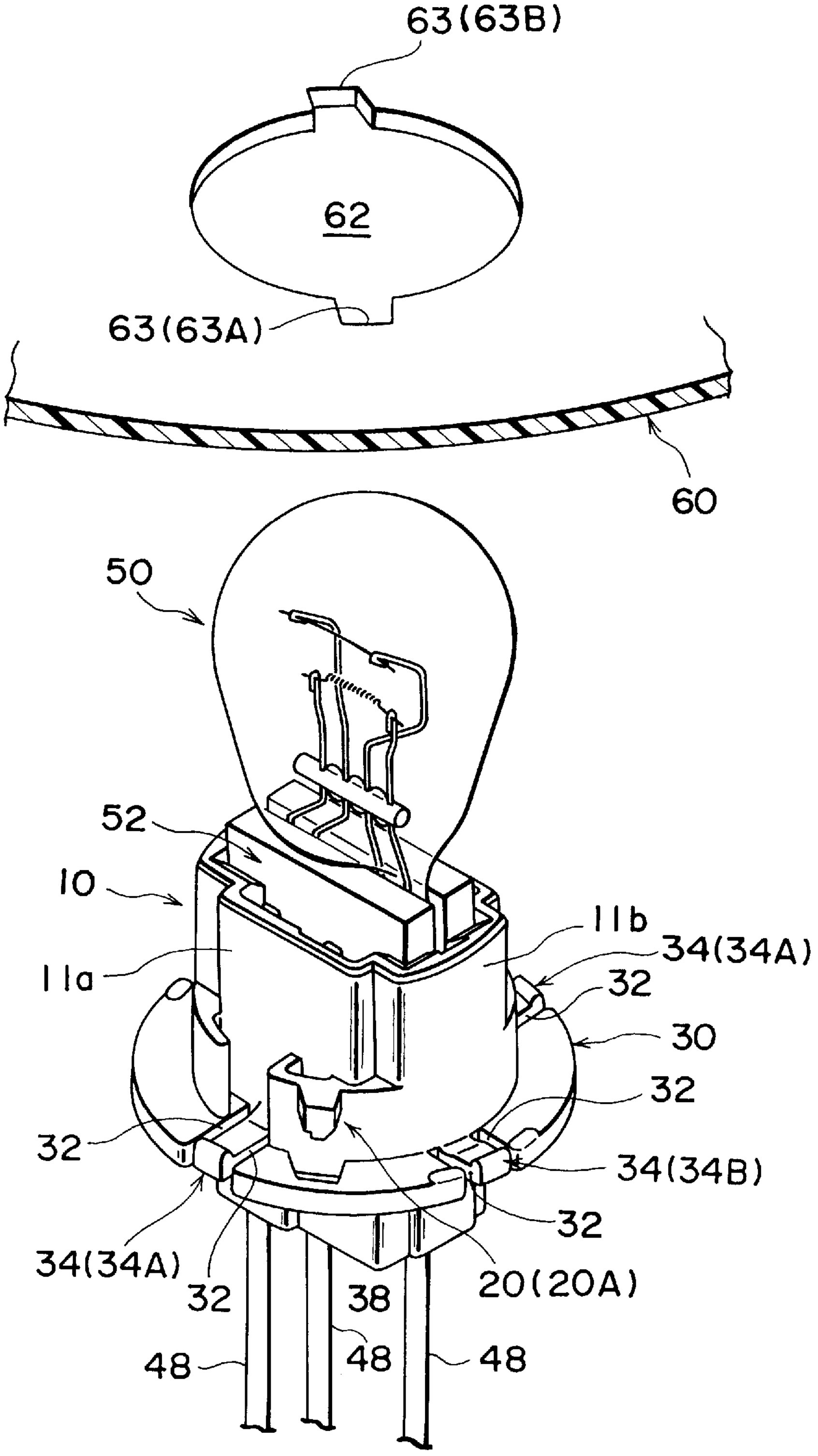
FIG. 11 is a perspective view of the above socket and a socket mounting hole.

Within the bulb insertion opening 12, there are stored a negative side terminal 40A shown in FIG. 9 and a positive side terminal 40B shown in FIG. 10 so that they can be electrically connected with the two filaments 56*a* and 56*b* provided within the. bulb 50 inserted into the bulb insertion opening 12.

In particular, the terminal 40A includes a plate-like base portion 41 and two plate-like side surface portions 42 respectively disposed on the right and left sides of the plate-like base portion 41. Each of the side surface portions 42 includes a tongue-piece-shaped contact hold piece 44 which is turned down inwardly, and an electric wire 48 is connected by crimping the lower end of the plate-like base portion 41 to the wire. On the other hand, the terminal 40B includes, in the plate-like base portion 41 thereof, a turned-down tongue-piece-shaped contact hold piece 44, and another electric wire 48 is connected by crimping the lower end of the plate-like base portion 41 to the wire.

The plate-like base portion 41 includes a rectangular securing piece 46 which is formed by cutting and raising a section of the base portion 41. In particular, by bringing the securing piece 46 into engagement with a stepped portion 14*a* (see FIGS. 6 and 8) of a securing groove 14 formed in the bulb insertion opening 12, the terminals can be held in a removal preventive manner, while the electric wires 48 respectively connected to the terminals 40A and 40B are guided through the rear end portion of the socket main body 10.

In a state that the bulb 50 (in particular, the base 52 thereof) is inserted into the bulb insertion opening 12, the tongue-piece-shaped contact hold pieces 44 of the terminals 40A and 40B hold between them the lead wires 55 exposed on the outside surface of the lead wire hold portion 54, so that the terminals 40A and 40B can be electrically connected with the lead wires 55.

Also, diametrically opposed from each other on the outside surface of the socket main body 10, there are disposed securing projections 20 (20A and 20B) which can be engaged in a bayonet-like manner in a socket mounting hole 62 (see FIG. 11) formed in a reflector 60 to thereby prevent the socket main body 10 from being removed. In this regard, it is noted that notches 63 (63A and 63B) are provided in the edge defining the socket mounting hole 62 for receiving the securing projections 20 (20A and 20B). Also, at the positions that are axially spaced by a given distance (a distance slightly greater than the plate thickness of the peripheral edge portion of the socket mounting hole 62) from the securing projections 20 (20A and 20B), there are disposed four belt-like elastic hold pieces 34 (34A and 34B) which can cooperate with the securing projections 20 (20A and 20B) to hold the socket main body in the socket mounting hole 62.

That is, at a position spaced from the securing projections 20 by a distance d (see FIGS. 4, 5 and 7) which is slightly greater than the plate thickness t (see FIG. 12) of the peripheral edge portion of the socket mounting hole 62, there is disposed a horizontal flange portion 30 which is high in rigidity and extends along the periphery of the socket main body 10; at four peripheral direction substantially quadrisected positions (i.e., four equally spaced positions) of the horizontal flange portion 30 which are not overlapped on the formation positions of the securing projections 20 in the axial direction of the socket main body 10, there are formed four slits 32 which respectively extend in the radial direction of the horizontal flange portion 30; and, the four belt-shaped elastic hold pieces 34 are disposed in such a manner that they are respectively spaced from the horizontal flange portion 30 through the slits 32 formed on the right and left side thereof and also extend outwardly in the radial direction thereof. Openings 38 are formed in the horizontal flange portion 30 at the positions corresponding to the securing projections 20 and also through which molds for forming the securing projection 20 can be inserted.

Figure 12:
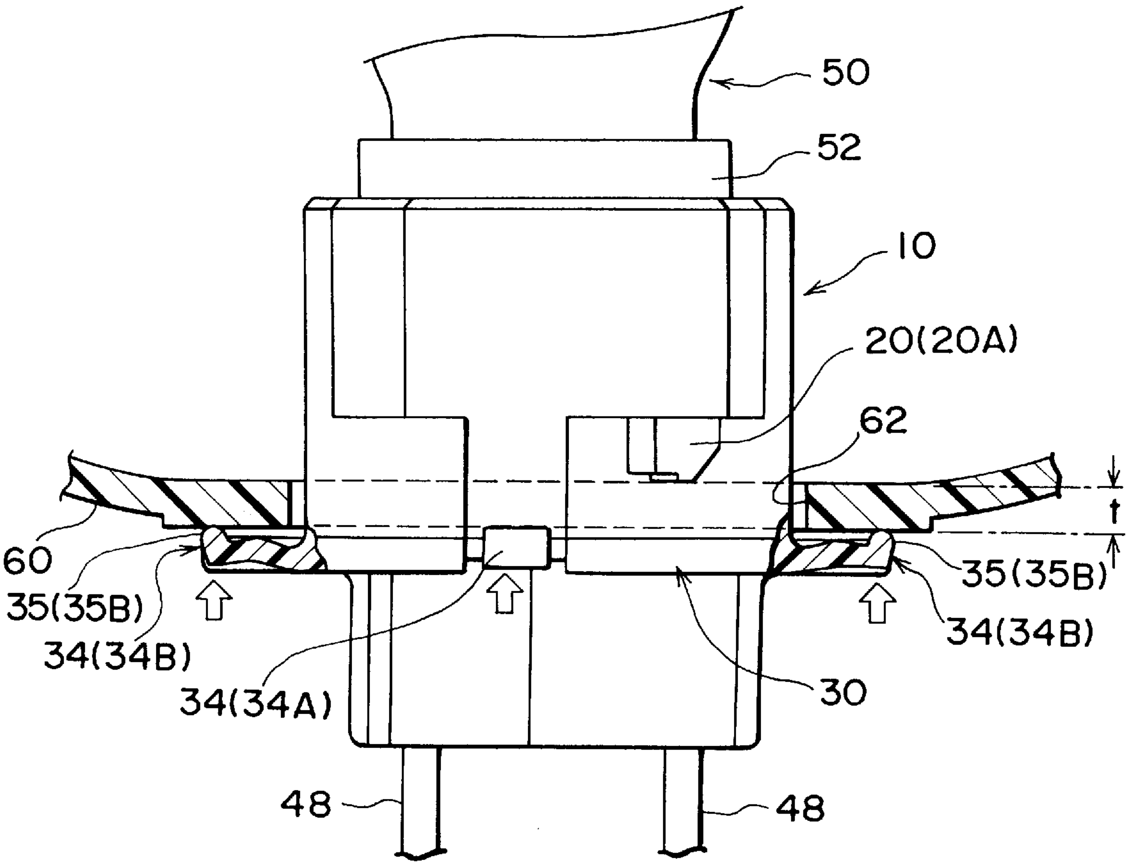
FIG. 12 is a section view of the periphery of the socket mounting hole into which the above socket with a bulb inserted integrally thereinto is mounted.

The belt-shaped elastic hold pieces 34 extend substantially in parallel with the horizontal flange portion 30 and include, in the leading end portions of their extending portions, projecting portions 35 which are projected forwardly of the front face of the horizontal flange portion 30; that is, as shown in FIG. 12, when the socket main body 10 is engaged with the socket mounting hole 62, the belt-shaped elastic hold pieces 34 cooperate with the securing projections 20 to hold the peripheral edge portion of the socket mounting hole 62.

In a state (see FIG. 12) that the socket main body 10 is in engagement with the socket mounting hole 62, the horizontal flange portion 30 with high rigidity extends adjacent to the peripheral edge portion of the socket mounting hole 62 to thereby produce only a slight clearance between the peripheral edge portion of the socket mounting hole 62 and the horizontal flange portion 30, which makes it difficult to loosen the engagement between the socket main body 10 and socket mounting hole 62.

Further, the belt-shaped elastic hold pieces 34 are disposed at the peripheral direction substantially quadrisected positions of the socket main body 10, so that the holding forces of the elastic hold pieces 34 for holding the socket main body 10 (that is, the forces thereof for fixing and holding the socket main body 10) are substantially uniform in the peripheral direction of the socket mounting hole 62. This reduces the possibility of loosening the engagement between the socket mounting hole 62 and socket main body 10.

In view of the fact that the bulb insertion opening 12 (in particular, the side surface walls 11*a* and 11*b* that form the bulb insertion opening) has a rectangular shape matched to the base 52 of the bulb 50, whereas the horizontal flange portion 30 has a circular shape, the four belt-shaped elastic hold pieces 34 include two types of hold pieces, that is, one 34A having a long length and the other 34B having a short length. The projecting strip portions 35A, which are provided on the extension leading end portions of the belt-shaped elastic hold pieces 34A having a long length, are set greater in height than projecting strip portions 35B provided on the extension leading end portions of the belt-shaped elastic hold pieces 34B having a short length, thereby being able to equalize the elastic forces (that is, the holding forces by the belt-shaped elastic hold pieces 34A and 34B) that are applied to the belt-shaped elastic hold pieces 34A and 34B which different in length from each other.

Also, the belt-shaped elastic hold pieces 34B having a short length are thinner in the plate thickness and narrower in the plate width than the belt-shaped elastic hold pieces 34A having a long length, so that the belt-shaped elastic hold pieces 34B are enhanced in flexibility. Due to this, when the socket main body 10 is engaged with the socket mounting hole 62, the elastic forces (holding forces) by all the belt-shaped elastic hold pieces 34 can be equalized.

Further, although the belt-shaped elastic hold pieces 34B having a short length are smaller in flexibility than the belt-shaped elastic hold pieces 34A having a long length, by reducing the plate thickness of the root portion thereof, the flexibility thereof can be enhanced and, by providing an R shape to the root portion thereof, the strength of the hold piece 34B can be enhanced with respect to localized stresses.

The plate thickness t1 of the leading end side of the belt-shaped elastic hold piece 34A having a long length, as shown in FIG. 7, is set smaller than the plate thickness t2 of the root side thereof, thereby being able to provide sufficient flexibility as well as sufficient bending strength. That is, when the socket main body 10 is engaged with the socket mounting hole 62, the leading end portion of the belt-shaped elastic hold piece 34A is pressed against the peripheral edge portion of the socket mounting hole 62 to thereby produce a bending stress in the belt-shaped elastic hold piece 34A. However, if the plate thickness of the leading end side of the belt-shaped elastic hold piece 34A having a long length is set smaller than the plate thickness of the root side thereof, then a sufficient flexibility can be achieved on the leading end side of the belt-shaped elastic hold piece on which a small bending stress acts. At the same time, if the plate thickness of the root side of the belt-shaped elastic hold piece is set larger than the plate thickness of the leading end side thereof, then a sufficient bending strength can be achieved on the leading end side of the belt-shaped elastic hold piece on which a large bending stress acts.

Also, vibrations, which are transmitted from the reflector 60 to the socket main body 10, are absorbed and are thereby reduced by the belt-shaped elastic hold pieces 34 pressed against the peripheral edge portion of the socket mounting hole 62, which eliminates an inconvenience that the bulb 50 can be vibrated to move the light distribution of the lamp slightly. Since the belt-shaped elastic hold pieces 34 are equally spaced from each other in the circumferential direction, they are able to reduce effectively any vibrations transmitted thereto from any directions in the peripheral direction of the socket main body 10.

Figure 14:
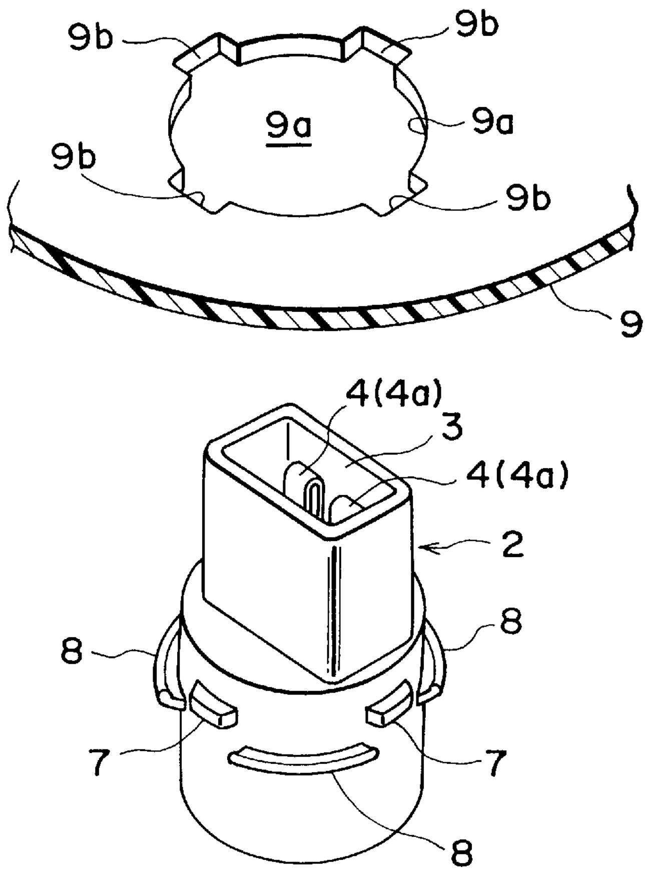
FIG. 14 PRIOR ART
FIG. 14 is a perspective view of a bulb socket and a socket mounting hole according to the prior art.
Figure 15:
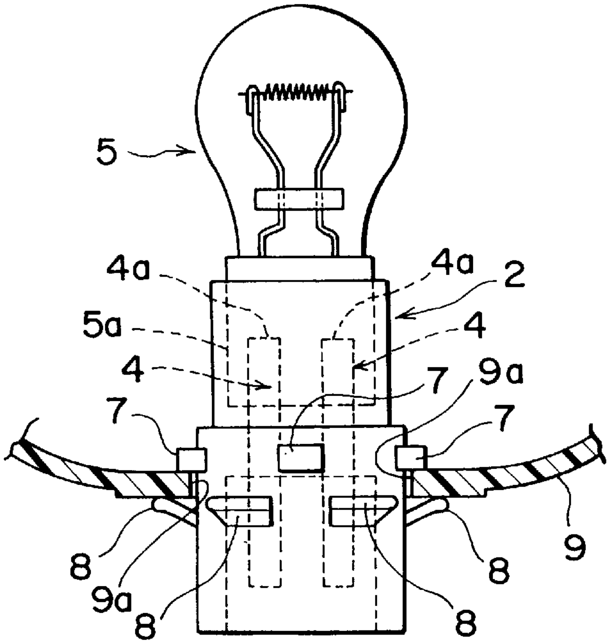
FIG. 15 PRIOR ART
FIG. 15 is a section view of the periphery of the socket mounting hole into which the conventional socket with a bulb inserted integrally thereinto is mounted.
Figure 16:
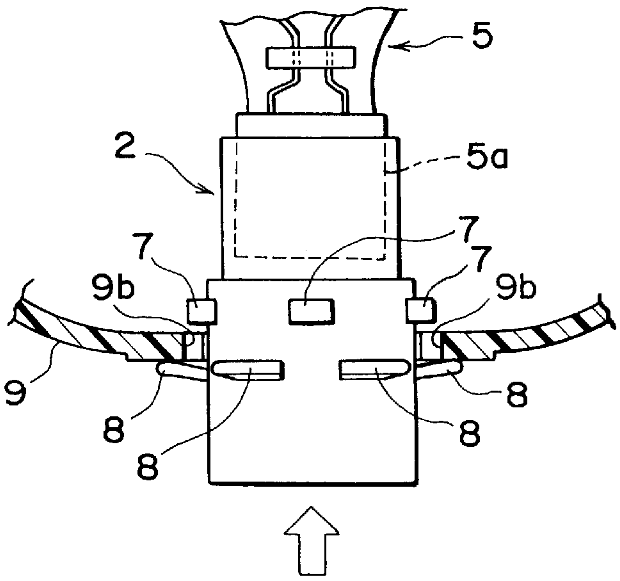
FIG. 16 PRIOR ART
FIG. 16 is a section view of the conventional bulb socket and socket mounting hole, showing how to mount the former into the latter.

Further, when mounting the socket main body 10 into the socket mounting hole 62, the socket main body 10 is pushed into the socket mounting hole 62 with the securing projections 20 (20A and 20B) matched to the notches 63 (63A and 63B) of the socket mounting hole 62 and, at the same time, the thus pushed-in socket main body 10 is rotated a given amount along the peripheral edge portion of the socket mounting hole 62. In this operation, since the belt-shaped elastic hold pieces 34 have excellent flexibility, an elastic force acting on the belt-shaped elastic hold pieces 34 when the socket main body 10 is pushed into the socket mounting hole 62 is smaller than an elastic force acting on the elastic flange portion in the conventional structure shown in FIGS. 14 to 16. Therefore, a frictional resistance occurring when the socket main body 10 is rotated with respect to the socket mounting hole 62 is also small, so that the bulb can be mounted and removed smoothly.

On the other hand, the excellent flexibility of the belt-shaped elastic hold pieces 34 also can cause a possibility that, when the socket main body 10 is pushed into the socket mounting hole 62, an excessive load (a stress of an allowable stress or more) can be applied to the belt-shaped elastic hold pieces 34. However, if the socket main body 10 is pushed into the socket mounting hole 62 a given amount or more to thereby cause the securing projections 20 to be situated on the front surface side of the socket mounting hole 62 (that is, there occurs a state that the belt-shaped elastic hold pieces 34 are caused to oscillate and sink into the slits 32 in the horizontal flange portion 30), then the horizontal flange portion 30 having a high rigidity is butted against the peripheral edge portion of the socket mounting hole 62 to thereby prevent any further load from being applied to the belt-shaped elastic hold pieces 34, which can also eliminate an inconvenience that the belt-shaped elastic hold pieces 34 can be broken.

Since the four belt-shaped elastic hold pieces 34 are equally spaced from each other in the circumferential direction of the socket main body 10, a reaction to the push-in force of the socket main body 10 into the socket mounting hole 62 is dispersed to the four belt-shaped elastic hold pieces 34 to thereby reduce the load accordingly which can be applied to each of the four belt-shaped elastic hold pieces 34. That is, the belt-shaped elastic hold pieces 34 are difficult to break.

Further, at the outer peripheral edge positions of the horizontal flange portion 30 that are situated on the right and left side of the projecting strip portion 35B of the belt-shaped elastic piece 34B having a short length, there is provided a rib 31 which is formed in such a manner that it does not project forwardly of the projecting strip portion 35B but rises slightly on and from the front surface of the horizontal flange portion 30, and also which can be contacted with the peripheral edge portion of the socket mounting hole. This ensure that a load of an allowable stress or more will not be applied to the belt-shaped elastic piece 34B.

That is, although the belt-shaped elastic pieces 34A and 34B are structured such that the horizontal flange portion 30 prevents a load equal to an allowable stress or more from being applied to them, the belt-shaped elastic pieces 34B having a short length are lower in flexibility than the belt-shaped elastic pieces 34A having a long length. For this reason, when the socket main body 10 is pushed into the socket mounting hole 62 forcibly with all the strength, there is a fear that the horizontal flange portion 30 can be elastically deformed only slightly to thereby apply a load near an allowable stress to the belt-shaped elastic pieces 34B having a short length. In view of this, the slightly raised ribs 31 which can be contacted with the peripheral edge portion of the socket mounting hole 62 are provided on the horizontal flange portion 30 side, thereby providing a structure which is sure to prevent an excessive load from acting on the belt-shaped elastic pieces 34B that can be broken relatively easily.

Figure 13:
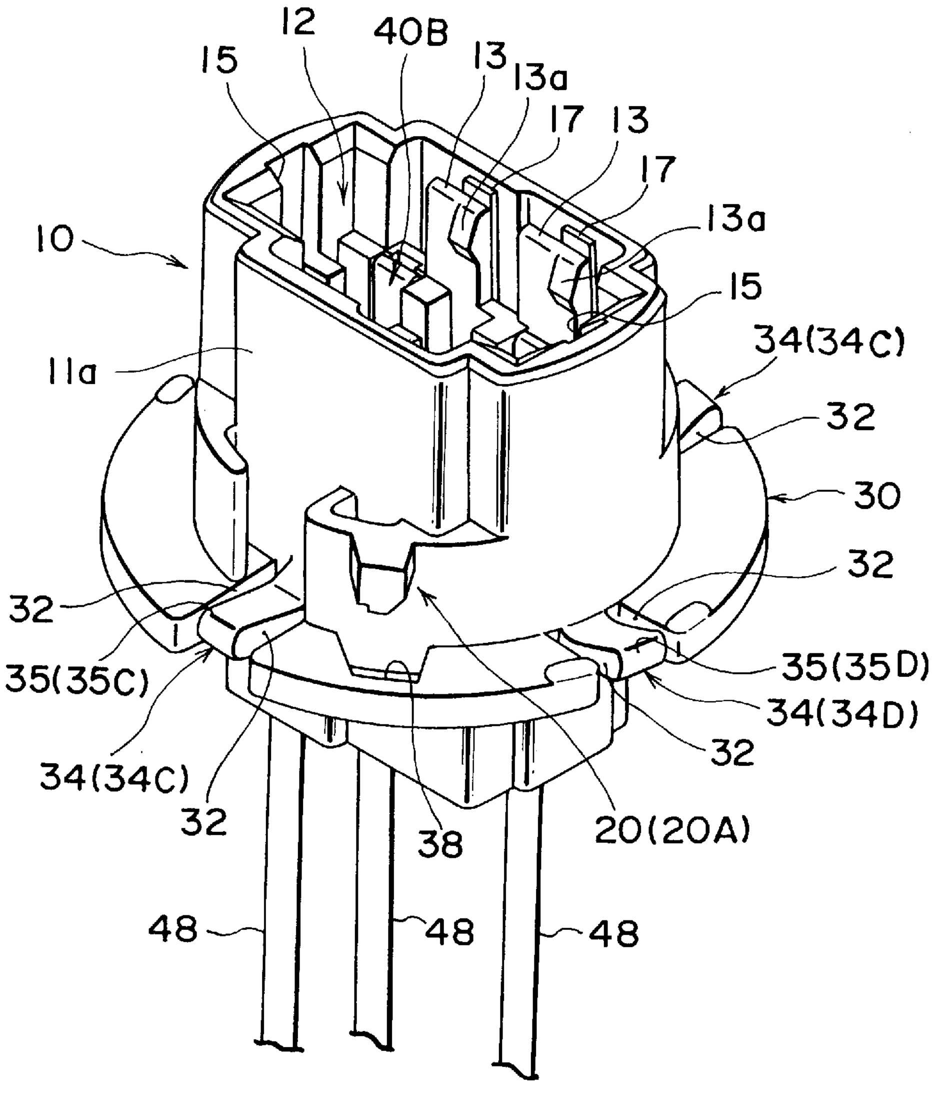
FIG. 13 is a perspective view of a second embodiment of a socket for a wedge base bulb according to the invention.

Now, FIG. 13 is a perspective view of a second embodiment of a socket for a wedge base bulb according to the invention.

In the previously described first embodiment, the belt-shaped elastic hold pieces 34 (34A and 34B) extend substantially in parallel to the horizontal flange portion 30 and include the projecting strip portions 35 (35A and 35B) which project forwardly of the leading end portions of the parallel extending portions of the belt-shaped elastic hold pieces 34 (34A and 34B). On the other hand, in the second embodiment, belt-shaped elastic hold pieces 34 (34C and 34D) are structured in such a manner that, as they approach the leading end portions of the parallel extending portions thereof, they are inclined so that they can be situated more forwardly of the horizontal flange portion 30 (that is, nearer to the securing projections 20).

The amount by which the leading end portions of the extended portions of the belt-shaped elastic hold pieces 34 (34C and 34D) project forwardly of the horizontal flange portion 30 is equal to the amounts of projection of the projecting strip portions 35A and 35B of the belt-shaped elastic hold pieces 34 (34A and 34B) forwardly of the horizontal flange portion 30.

The remaining portions of the second embodiment are the same as those of the first embodiment. Therefore, they are given the same designations and the description thereof is omitted here.

As can be clearly understood from the foregoing description, according to the invention, not only because the peripheral edge portion of the socket mounting hole is held by the securing projections and belt-shaped elastic hold pieces but also because there is only a slight clearance between the peripheral edge portion of the socket mounting hole and the horizontal flange portion, the socket main body can be positively fixed to and held by the socket mounting hole without being loosened with respect to the socket mounting hole.

Also, since various loads such the vibrations transmitted to the socket main body can reduced by the belt-shaped elastic hold pieces of the socket main body, there is eliminated the fear that the light distribution of a lighting device can be disturbed by vibrations produced by an engine or by vibrations caused by the running motion of a vehicle.

Further, because an elastic force acting on the belt-shaped elastic hold pieces when the socket main body is pushed into the socket mounting hole as well as a frictional resistance produced when the socket main body is rotated with respect to the socket mounting hole are both smaller than the conventional structure, the socket main body can be mounted and removed smoothly.

Moreover, due to the fact that, when the socket main body is pushed into the socket mounting hole, even if the socket main body is forcibly pushed in with an excessive force, the belt-shaped elastic hold pieces are prevented from experiencing excessive force (that is, a stress equal to an allowable stress or more), the long durability of the belt-shaped elastic hold pieces can be achieved.

Further, according to the invention, since the pressure contact forces applied to the peripheral edge portion of the socket mounting hole by the respective belt-shaped elastic hold pieces can be made uniform, the socket main body can be fixed and held positively, the vibration reduction effect can be enhanced further, and the mounting and removal of the socket main body can be achieved more easily.

Also, according to the invention, because the belt-shaped elastic hold pieces having a long length can have both characteristics, that is, a sufficient flexibility and a sufficient bending strength, the durability of the belt-shaped elastic hold pieces having a long length can be achieved.

What is claimed is:

1. A bulb socket engageable in a socket mounting hole of a lamp body having a predetermined thickness at an edge portion of said socket mounting hole, comprising:

a socket main body having a bulb insertion opening;

a flange extending from an outer surface of said socket main body;

a plurality of securing projections disposed on said outer surface of said socket main body and axially spaced from said flange by a predetermined distance which is greater than said predetermined thickness, said securing projections being engageable with said lamp body in a bayonet-like manner to secure said socket main body in said socket mounting hole of said lamp body; and a plurality of elastic hold members, cooperable with the securing projections, to secure said socket main body in said socket mounting hole, said elastic hold members being spaced apart from each other around the circumference of said flange and being substantially coplanar with said flange portion, said elastic hold members being separated from said flange portion by slits formed on opposite sides of said elastic hold members, each of said elastic hold members including a portion projecting in a forward direction from an associated one of said elastic hold members toward said securing projections and beyond an upper surface of said flange portion.

2. A bulb socket as set forth in claim 1, wherein said elastic hold members extend substantially parallel to said flange portion.

3. A bulb socket as set forth in claim 1, wherein said elastic hold members are slightly inclined in said forward direction.

4. A bulb socket as set forth in claim 1, wherein said elastic hold members differ in length from each other so as to include long elastic hold members and short elastic hold members.

5. A bulb socket as set forth in claim 4, wherein said projecting portion associated with said long elastic hold members extends further than said projecting portion associated with said short elastic hold members.

6. A bulb socket as set forth in claim 4, wherein said long elastic hold members have a greater thickness in said forward direction than said short elastic hold members.

7. A bulb socket as set forth in claim 4, wherein said long elastic hold members have a greater width than said short elastic hold members.

8. A bulb socket as set forth in claim 4, wherein the thickness of said long elastic hold members is tapered with the thickness at the end thereof being smaller than the thickness at the base thereof.

9. The bulb socket as set forth in claim 1 where said projecting portion is a rib.

10. A bulb socket comprising:

a socket main body formed of resin and including a bulb insertion opening;

a plurality of securing projections extending from said socket main body and engageable with a socket mounting hole formed in a bulb mounting member to thereby prevent the socket main body against removal; and a plurality of elastic hold portions cooperable with the securing projections to hold the peripheral edge portion of the socket mounting hole, wherein a horizontal flange portion is disposed on the peripheral portion of said socket main body outside surface that is spaced apart from said securing projections by an amount slightly greater than the plate thickness of said socket mounting hole peripheral edge portion, wherein said elastic hold portions are respectively disposed at a plurality of substantially equally divided positions of said horizontal flange portion in the peripheral direction thereof, wherein said elastic hold portions are respectively separated apart from said horizontal flange portion through slits formed on the right and left sides thereof and extend outwardly in a radial direction of said horizontal flange portion, and wherein a leading end portion of said elastic hold portions are composed of belt-shaped elastic hold pieces respectively projecting forwardly of said horizontal flange portion.

11. A bulb socket as set forth in claim 10, wherein said belt-shaped elastic hold pieces respectively extend substantially in parallel to said horizontal flange portion and include, in the leading end portions of said extending portions thereof, projections which respectively project forwardly of said leading end portions.

12. A bulb socket as set forth in claim 10, wherein said belt-shaped elastic hold pieces extend in an inclined manner so as to be positioned more forwardly approaching said extension leading end portions.

13. A bulb socket as set forth in claim 10, wherein said belt-shaped elastic hold pieces include a plurality of belt-shaped elastic hold pieces differing in length from each other and said belt-shaped hold pieces are formed in such a manner that, the longer the length the more forwardly the extension leading end portions thereof exist.

14. A bulb socket as set forth in claim 13, wherein said belt-shaped elastic hold pieces are formed in such a manner that the shorter length elastic hold pieces have a smaller thickness.

15. A bulb socket as set forth in claim 10, wherein said belt-shaped elastic hold pieces are formed in such a manner that the shorter length elastic hold pieces have a narrower width.

16. A bulb socket as set forth in claim 10, wherein said belt-shaped elastic hold pieces having a long length are formed in such a manner that the plate thickness of the leading end side thereof is smaller than the plate thickness of the root side thereof.

* * * * *